United States Patent [19]
Au

[11] Patent Number: 5,355,473
[45] Date of Patent: Oct. 11, 1994

[54] INDEXED RECORD LOCATING AND COUNTING MECHANISM

[76] Inventor: Lawrence Au, 1931 17th St. N.W. #401, Washington, D.C. 20009

[21] Appl. No.: 718,286

[22] Filed: Jun. 20, 1991

[51] Int. Cl.$^5$ .......................................... G06F 15/40
[52] U.S. Cl. ................... 395/600; 364/974.3; 364/963; 364/960.5; 364/DIG. 2
[58] Field of Search ......... 395/600; 364/419, DIG. 1, 364/DIG 2

[56] References Cited

U.S. PATENT DOCUMENTS

| | | | |
|---|---|---|---|
| 4,429,385 | 1/1984 | Cichelli et al. | 370/92 |
| 4,468,728 | 8/1984 | Wang | 395/600 |
| 4,677,550 | 6/1987 | Ferguson | 395/600 |
| 4,774,657 | 9/1988 | Anderson et al. | 395/600 |
| 4,914,569 | 4/1990 | Levine et al. | 395/600 |
| 5,043,872 | 8/1991 | Cheng et al. | 395/600 |
| 5,095,458 | 3/1992 | Lynch et al. | 364/787 |
| 5,202,986 | 4/1993 | Nickel | 395/600 |

OTHER PUBLICATIONS

D. Knuth, The Art of Computer Programming: "Sorting and Searching", Addison-Wesley © 1973.
Aho et al., Data Structures and Algorithms, Addison-Wesley © 1983.
Kruse, Data Structures and Programming Design, Prentice-Hall © 1984.
Sedgewick, Algorithms, Addison-Wesley © 1983.

*Primary Examiner*—Thomas C. Lee
*Assistant Examiner*—Maria N. Von Buhr

[57] ABSTRACT

An indexed record locating and counting mechanism quickly returns time critical information to query mechanisms. The amount of time required to return time critical information is linearly bounded by the length of the sequences of symbols or records requested by the query, allowing massively scaled databases to be manipulated quickly and efficiently on a record by record basis.

1 Claim, 9 Drawing Sheets

| STEPS | STEP / STEPS | \multicolumn{9}{c}{RECNUMS FOR MAXCOUNT =} |

| STEPS | STEP / STEPS | 1 | 2 | 3 | 4 | 5 | 6 | 7 | 8 | 9 |
|---|---|---|---|---|---|---|---|---|---|---|
| 1 | 1 | 1.0 | 2.0 | 3.0 | 4.0 | 5.0 | 6.0 | 7.0 | 8.0 | 9.0 |
| 2 | 1/2 |  | 1.0 | 1.5 | 2.0 | 2.5 | 3.0 | 3.5 | 4.0 | 4.5 |
|  | 2/2 |  | 2.0 | 3.0 |  |  |  |  |  |  |
| 4 | 1/4 |  |  | 0.75 | 1.0 | 1.25 | 1.5 | 1.75 | 2.0 | 2.25 |
|  | 2/4 |  |  | 1.5 |  |  |  |  |  |  |
|  | 3/4 |  |  | 2.25√ | 3.0 | 3.75 | 4.5 | 5.25 | 6.0 | 6.75 |
|  | 4/4 |  |  | 3.0 |  |  |  |  |  |  |
| 8 | 1/8 |  |  |  |  | 0.625 | 0.75 | 0.875 | 1.0 | 1.125 |
|  | 2/8 |  |  |  |  | 1.25 | 1.5 | 1.75 | 2.0 |  |
|  | 3/8 |  |  |  |  | 1.875 | 2.25√ | 2.625√ | 3.0 | 3.375 |
|  | 4/8 |  |  |  |  | 2.5 | 3.0 | 3.5 | 4.0 |  |
|  | 5/8 |  |  |  |  | 3.125 | 3.75 | 4.375√ | 5.0 | 5.625 |
|  | 6/8 |  |  |  |  | 3.75 | 4.5 | 5.25 | 6.0 |  |
|  | 7/8 |  |  |  |  | 4.375√ | 5.25√ | 6.125√ | 7.0 | 7.875 |
|  | 8/8 |  |  |  |  | 5.0 | 6.0 | 7.0 |  |  |
| 16 | 1/16 |  |  |  |  |  |  |  |  | 0.5625 |
|  | 2/16 |  |  |  |  |  |  |  |  | 1.125 |
|  | 3/16 |  |  |  |  |  |  |  |  | 1.6875 |
|  | 4/16 |  |  |  |  |  |  |  |  | 2.25 |
|  | 5/16 |  |  |  |  |  |  |  |  | 2.8125 |
|  | 6/16 |  |  |  |  |  |  |  |  | 3.375 |
|  | 7/16 |  |  |  |  |  |  |  |  | 3.9375 |
|  | 8/16 |  |  |  |  |  |  |  |  | 4.5 |
|  | 9/16 |  |  |  |  |  |  |  |  | 5.0625 |
|  | 10/16 |  |  |  |  |  |  |  |  | 5.625 |
|  | 11/16 |  |  |  |  |  |  |  |  | 6.1875 |
|  | 12/16 |  |  |  |  |  |  |  |  | 6.75 |
|  | 13/16 |  |  |  |  |  |  |  |  | 7.3125 |
|  | 14/16 |  |  |  |  |  |  |  |  | 7.875 |
|  | 15/16 |  |  |  |  |  |  |  |  | 8.4375√ |
|  | 16/16 |  |  |  |  |  |  |  |  | 9.0 |

Fig. 8

INDEXED RECORD LOCATING AND COUNTING MECHANISM

BACKGROUND OF THE INVENTION

The invention relates to improvements of access to data in the general form of TRIE tree indexed records. TRIE tree indexes are described in Knuth: The Art of Computer Programming, "Searching and Sorting" (pp. 481-505) (1973), in Aho, Hopcroft, and Ullman: Data Structures and Algorithms (pp. 163-169)(1983), in Kruse: Data Structures and Program Design (pp. 377-382)(1984), and as radix search trees in Sedgewick: Algorithms (pp. 213-223)(1983).

The use of such a tree for a multi-user database system with enhancements to concurrent access features is described in U.S. Pat. No. 4,914,569 to Levine and Mohan describing a means to traverse a B-Tree or TRIE tree in an orderly fashion while checking and updating the multi-user-access system on a node-by-node basis.

A design to improve query access to records indexed by TRIE trees is described in U.S. Pat. No. 4,774,657 to Anderson et al. describing a means to reduce the number of pages accessed to count the subtree leafs corresponding to a given query.

The quality of access to records can be described in general by the amount of time required to repaint the query screen. In other words, a figure of merit can be based on the perceived delay presented to the user issuing a database query.

Often a broadly stated query to a large database will return far more information than can be displayed simultaneously on a screen. In such circumstances the user is often given a scrollable partial listing of records. In such a user interface only a small subset of the records requested needs to be retrieved for display on the screen along with the record number range and the maximum number of records returned by the query. When the user scrolls to a different part of the listing, only another small subset of the records needs to be retrieved and displayed on the screen.

Typical relational database systems provide this information after building temporary tables which are arrays of records retrieved in record number order. Although such arrays are easy to access by record number, such arrays can be time consuming to build. Often the entire query is executed to build them. This can result in a lengthy delay before any information about the first subset of records and the total number of records can be retrieved for the user.

The quality of access to records can be improved by eliminating the construction of temporary tables, and retrieving the first subset of records and the total number of records via a system of indirect references described in this invention. Other subsets of the records can also be retrieved via the same system of indirect references.

The user can then decide to alter the query slightly to better describe the information sought, without invoking the overhead of fully executing a query.

SUMMARY OF THE INVENTION

The invention avoids having to retrieve all records corresponding to a query, while retrieving the necessary information for browsing or making a database traversal decision. Each node of the TRIE tree contains a subleaf count of the number of leafs branching outward from that node.

A subleaf count is never less than one, since even a leaf node has itself as a leaf. A node close to the root node of the tree may have a subleaf count close to the leaf count for the entire tree.

A subleaf count stored in each node provides the necessary information to traverse the TRIE tree only once from top to bottom to retrieve both the nth record in a simple query and the maximum number of records in a simple query. Since a TRIE tree is bounded in length from top to bottom by the longest record indexed by the tree, the search time for the nth record is linearly bounded by this length, along with the time to return the maximum number of records in a query. The advantage of such bounding is obvious considering that a TRIE tree can store $26^n$ alphabetic records of length of n. For a length of only five characters, this corresponds to over 11 million records.

BRIEF DESCRIPTION OF THE DRAWINGS

FIG. 8 is a table showing the record numbers sampled by the procedures of FIG. 7 and FIG. 9 for a small number of records.

DETAILED DESCRIPTIONS OF THE PREFERRED EMBODIMENTS

Figure 1:
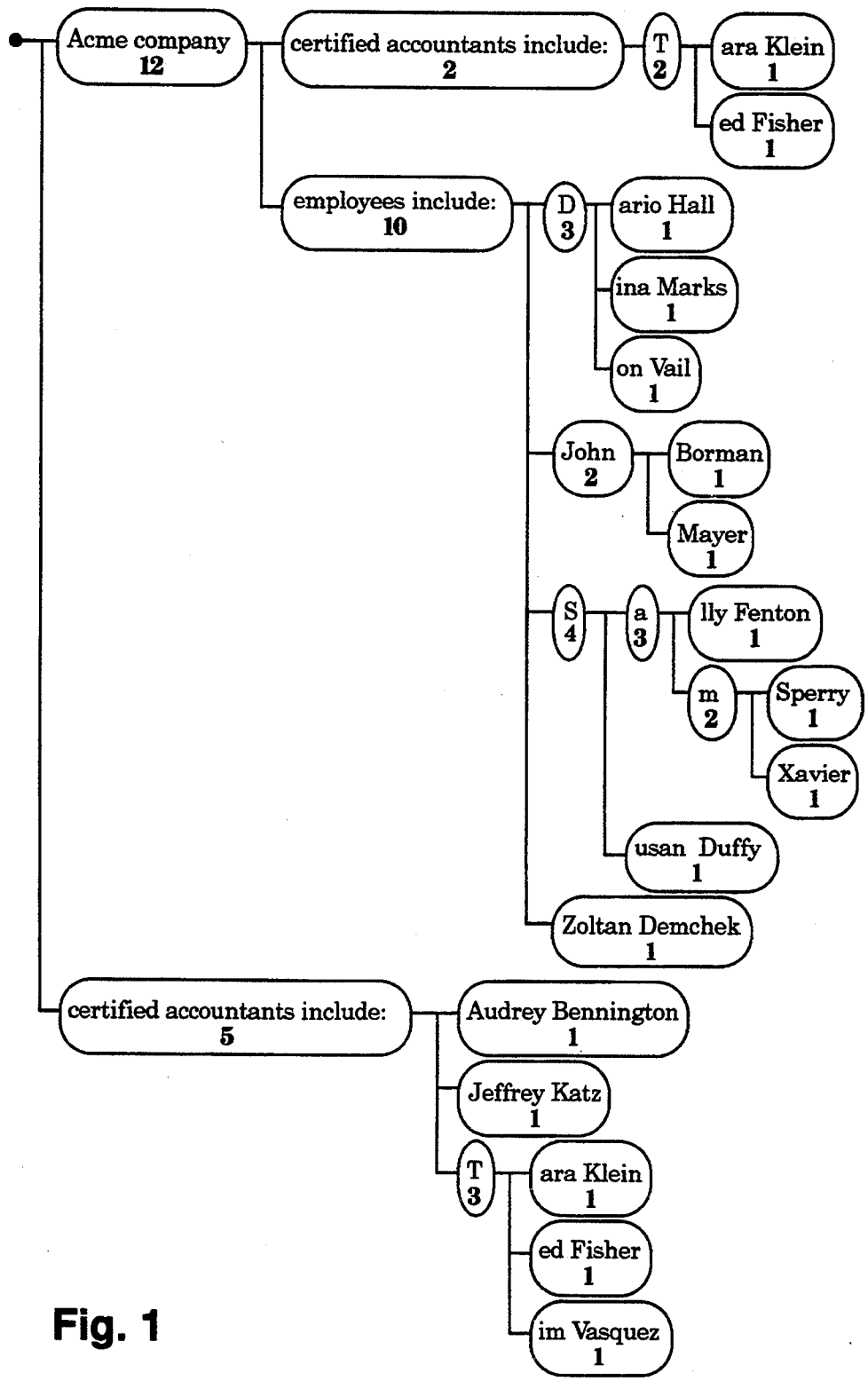
FIG. 1 is a node by node example of a small TRIE tree.

FIG. 1 is a representation of a TRIE tree which will be used to demonstrate operation of the preferred embodiments of this invention. Nodes connected by lines indicate the data structure of the tree. Each node consists of a text string which is the node's sub-sequence of symbols, and a boldface number which is the subleaf count for the node. The upper left-hand corner small black circle of the tree is the root node. The right side of the tree is made up of leaf nodes.

Each record represented by the TRIE tree can be read from left to right following the nodes from the root of the tree to the leaf, concatenating the sub-sequence of symbols in each node along the path. Each path from root to leaf stores a single record.

Leaf nodes of a TRIE tree can be used to point to structures outside the tree such as picture or sound data structures, or other TRIE trees. For simplicity in describing this invention, the examples given will focus on the ability of the TRIE tree to store within itself any unique symbol sequence of data. For instance, a text file containing sentences could be stored on a one sequence per sentence basis. To preserve sentence ordering each sentence could be prefixed by a sentence number.

Alternatively, a data base structured around tables with fields containing database values could be stored within a TRIE tree, where the table names would prefix the field names, and the field names would prefix the field values. For instance, in FIG. 1 "Acme company" could be a table name and "certified accountants include:" could be a field name and "employees include:" could be another field name.

In order to store duplicate field values in a TRIE tree one might for example put a distinguishing number in parenthesis after the value, to indicate that two of that value existed. In FIG. 1, if another employee named John Mayer was to be added, the leaf node Mayer could be amended to point to "(1)" and "(2)" which would become the new leaf nodes. The numbers in parenthesis would be not be considered the actual name itself when matching names in one part of the TRIE tree to names in other parts. For consistency, the numbers in parenthesis might be social security numbers unique to individual people.

Figure 2:
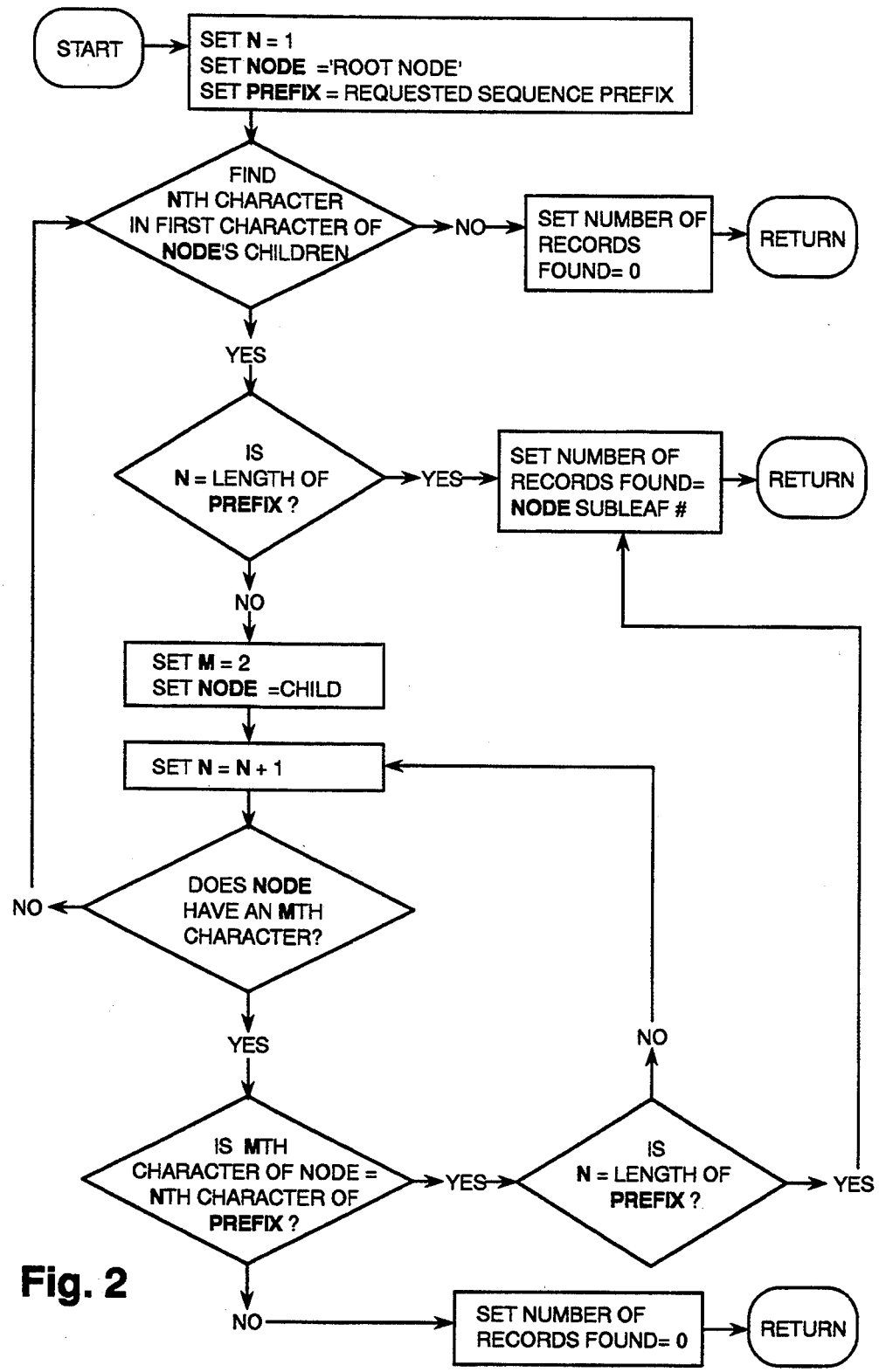
FIG. 2 is a procedure flow chart of the functions performed to count the maximum number of records retrieved by a simple query.

RETRIEVING A SIMPLE QUERY COUNT:

For example, to find the number of unique sequences beginning with "Acme company employees include:" represented in the data structure of FIG. 1, it is sufficient to find the node with the sub-sequence "employees include:" and the subleaf count of 10. A straightforward TRIE tree traversal can find this node using the procedure outlined in FIG. 2. The desired symbol sequence would be "Acme company employees include:". This would become the PREFIX. Each character of the PREFIX from left to right would be sought in turn while traversing the tree, until all the characters of the PREFIX were matched and the subleaf count number returned.

Figure 3:
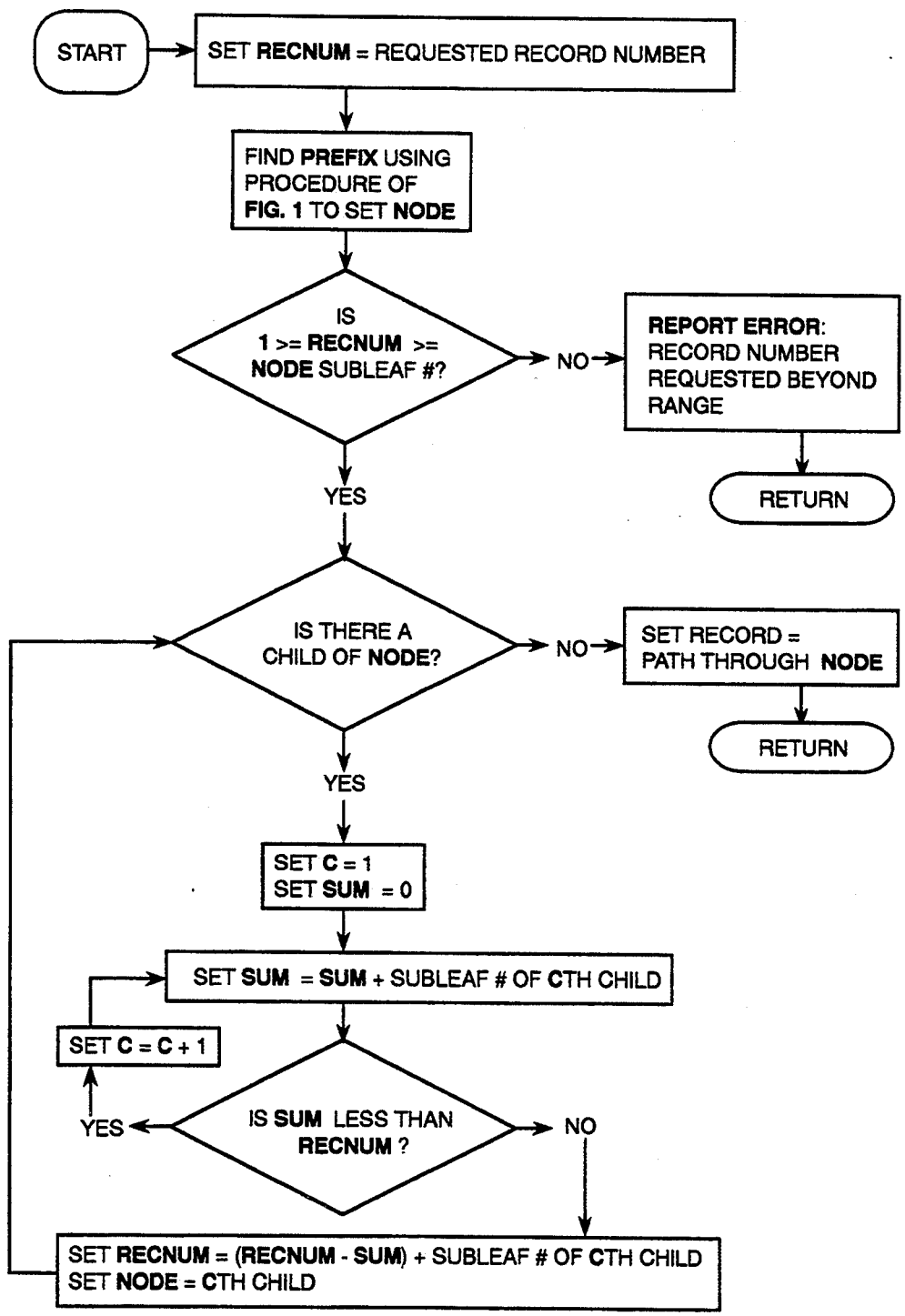
FIG. 3 is a procedure flow chart of the functions performed to retrieve the nth record of a simple query.

RETRIEVING A SIMPLE QUERY NTH RECORD:

Once a subleaf count is returned, the range of valid record numbers for the query is known and individual records can be requested by number. A direct traversal of the TRIE tree using the procedure of FIG. 3 can be used to return the nth record of the query, since each node has a subleaf count which allows the correct branch of the TRIE tree to be chosen. This is calculated using a RECNUM variable carrying the desired record number relative to the subleaf count number for each child node branching to the right of each node in the tree.

For example, to find the fifth record of "Acme company employees include:" the RECNUM would initially be assigned a value of 5. Since 5 is between 1 and 10, this would be within range. The node selected by the procedure of FIG. 2 contains the sub-sequence "employees include:" and has four child nodes with subleaf counts of 3, 2, 4, and 1. Summing $0+3=3, 3+2=5$ until the SUM reaches 5, the second child node is selected. The new RECNUM is assigned $5-5+2=2$, while the newly selected node contains "John" which has two children with subleaf counts of 1 and 1. Summing $0+1=1, 1+1=2$ until the SUM reaches 2, the second node is selected and has no children. The unique sequence for the record is assigned form the path of sub-sequences from the root node of the TRIE through this selected leaf node. Concatenation of these path nodes sub-sequences forms the record sequence "Acme company employees include: John Mayer".

Figure 4:
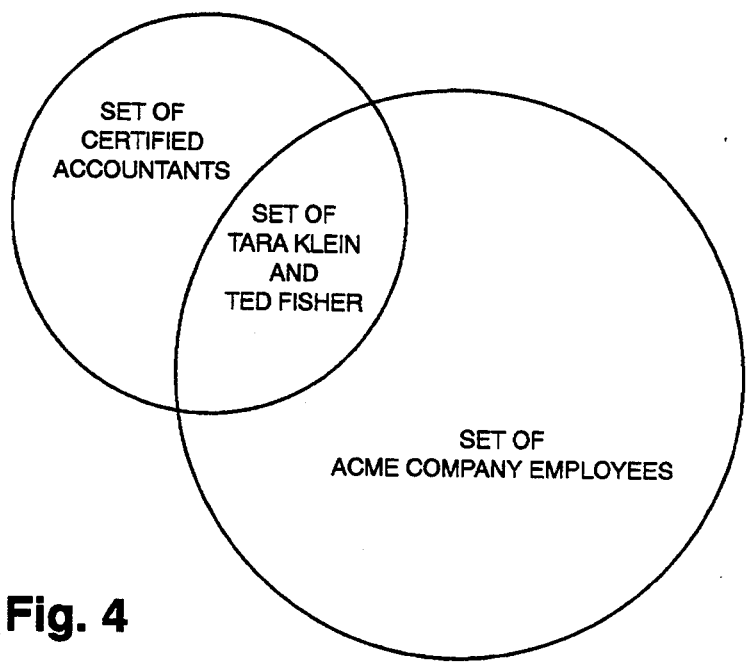
FIG. 4 is a Venn diagram of the sets of records involved in a compound query.

COMPOUND QUERY SETS:

Often a simple query must be joined with another simple query to define a compound query. The information which returns from a compound query can be defined by set notation. For instance, from the example of FIG. 1, a simple query might be "Acme company employees include:" which would return the ten company employees. Another simple query might be "certified accountants include:" which would return the five accountants from the lower subtree. A compound query might return any of the three Venn diagram regions shown in FIG. 4: The set of certified accountants which are not Acme company employees, the set of Acme company employees which are not certified accountants, and the intersection set of Tara Klein and Ted Fisher, who are both employees and accountants.

Note that a separate branch of the Acme company subtree exists to define the intersection set, in case it needs to be accessed by a simple query. For retrieval speed many separate branches of the Acme company subtree could be generated for various set intersections. For query flexibility, however, it is important that characteristics of set intersection can be quickly determined on the fly without pre-stored set intersections. Using the procedures outlined in FIG. 2 and FIG. 3 on the data structure of FIG. 1 such on the fly querying can be greatly improved.

Figure 5:
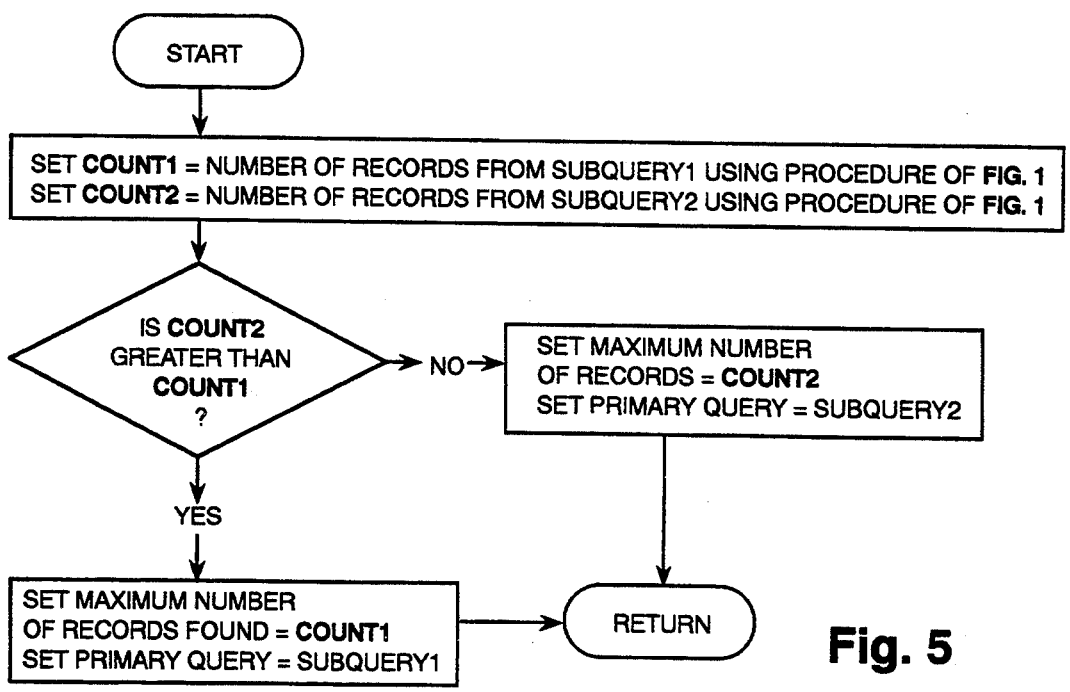
FIG. 5 is a procedure flow chart of the functions performed to count the maximum number of records of a compound query.

MAXIMUM NUMBER OF RECORDS RETURNING FROM A COMPOUND QUERY:

An important characteristic of a compound query is the maximum number of records which might return form the query. In FIG. 5 a procedure determines this number by using the procedure of FIG. 2 applied twice, once to each of the component sub-queries, retrieving one record count for each sub-query and returning the minimum of the two record counts. The primary query is chosen to minimize the number of records to be probed in determining the set intersection.

Figure 6:
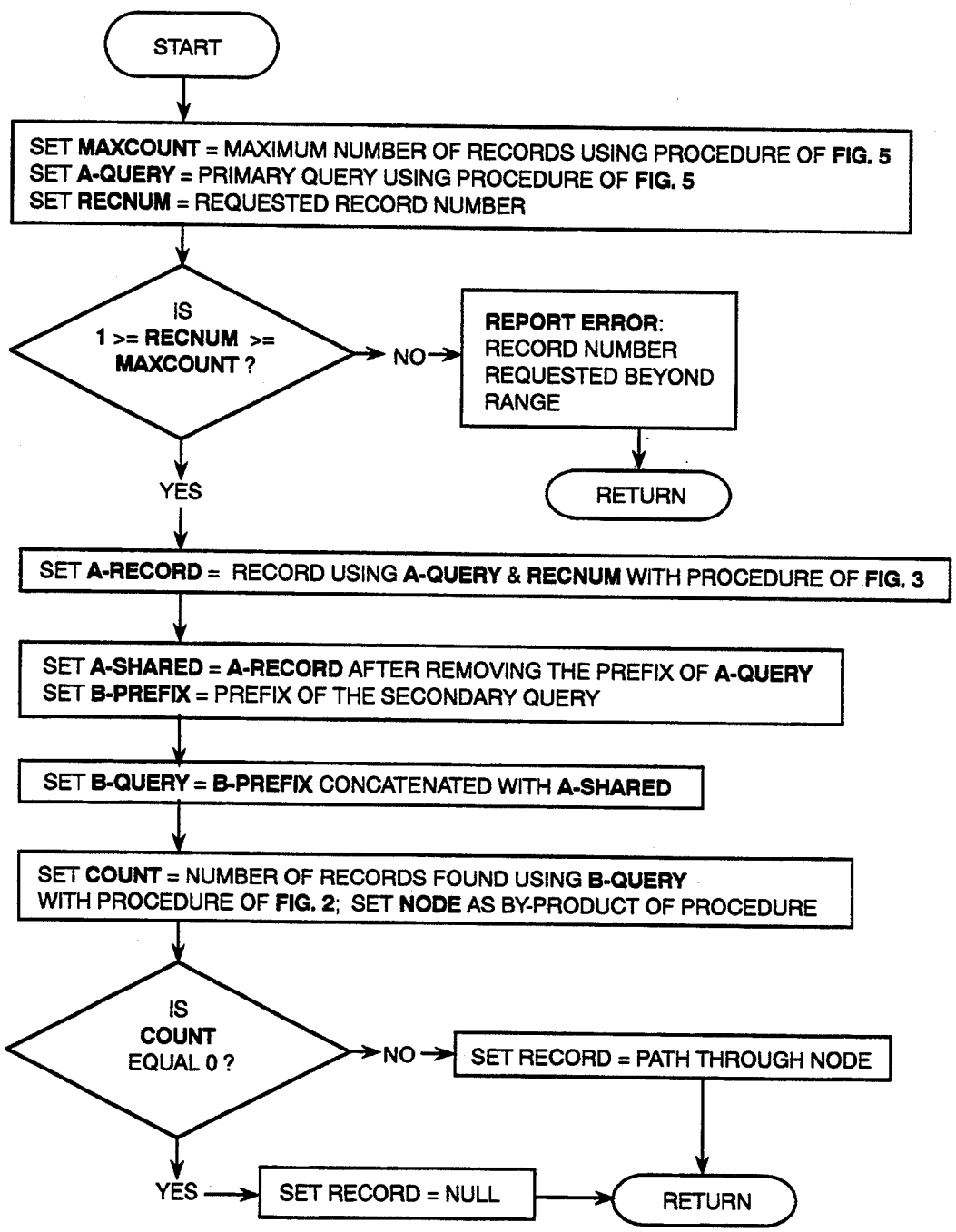
FIG. 6 is a procedure flow chart of the functions performed to retrieve the nth record of a compound query.

RETRIEVING A COMPOUND QUERY NTH RECORD:

Once the maximum number of records is known, a particular record can be retrieved by record number using the procedure of FIG. 6. Unlike typical relational database which retrieve only set intersection records, in FIG. 6 the set complement records are retrieved as null records, in case such records are needed. Using the procedure of FIG. 6, each record can be quickly accessed since any particular record is accessed by retrieving a record from the primary query and parsing to form the secondary query.

For example, to find the third record of the intersection between "certified accountants include:" and "Acme company employees include:" MAXCOUNT would be set to 5, the A-QUERY would be set to "certified accountants include:", and the RECNUM would be set to 3. Since RECNUM is within 1 and MAXCOUNT, the RECNUM would be within range. Then A-RECORD would be set to "certified accountants include: Tara Klein". The intersection substring would be parsed from this by removing the prefix from the record, setting A-SHARED to "Tara Klein". (In some implementations it may be more useful to parse using a delimiter character, for instance the colon, or a sequence of delimiter characters.) Then B-PREFIX would be set to "Acme company employees include:" B-QUERY would then be set to "Acme company employees include: Tara Klein". This simple query would return a record count of 1, and set the record to "ACME company employees include: Tara Klein". If the simple query had returned a count of 0, the record would have been set to null.

RETRIEVING A COMPOUND QUERY ESTIMATE:

When the maximum number of records is potentially large, it is important to be able to estimate the size of this intersection when making data base query traversal decisions. Such information can be used to decide if the intersection is important enough to pursue or if some alternative intersection be pursued. Using the procedure of FIG. 7, a sequence of nearly evenly distributed probes into the potential intersection records can be made, as time permits. The procedure generates the numbers in FIG. 8. Each column of numbers under MAXCOUNT for rows with STEPS less than or equal to MAXCOUNT shows the record by record probes made into the potential intersection. The probes are almost evenly scattered from record numbers 1 to MAXCOUNT. For MAXCOUNT equal to 1, 2, 4, 8 and any other power of 2 the procedure reaches each record exactly once with time permitting. For MAXCOUNT 3, 5, 6, 7, 9, and any other MAXCOUNT not a power of 2, there will be some record or records remaining. These will be probed by the procedure in FIG. 9.

When the elapsed tinge is greater than the allowable response time, an estimate of HITS and TRIES is returned as an estimate of the fraction of non-null records in the set intersection.

Figure 7:
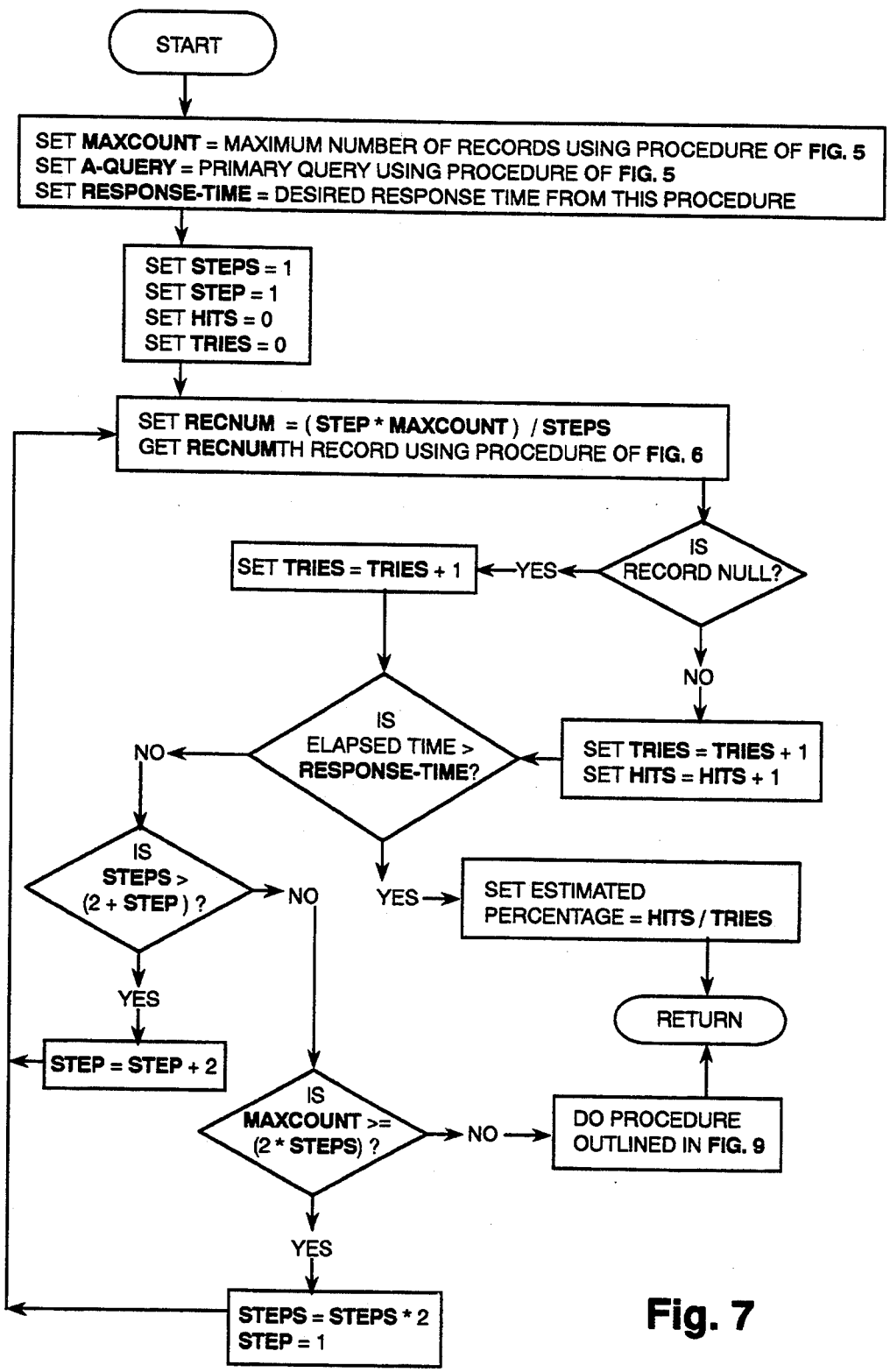
FIG. 7 is a procedure flow chart to estimate the number of records in a compound query.
Figure 9:
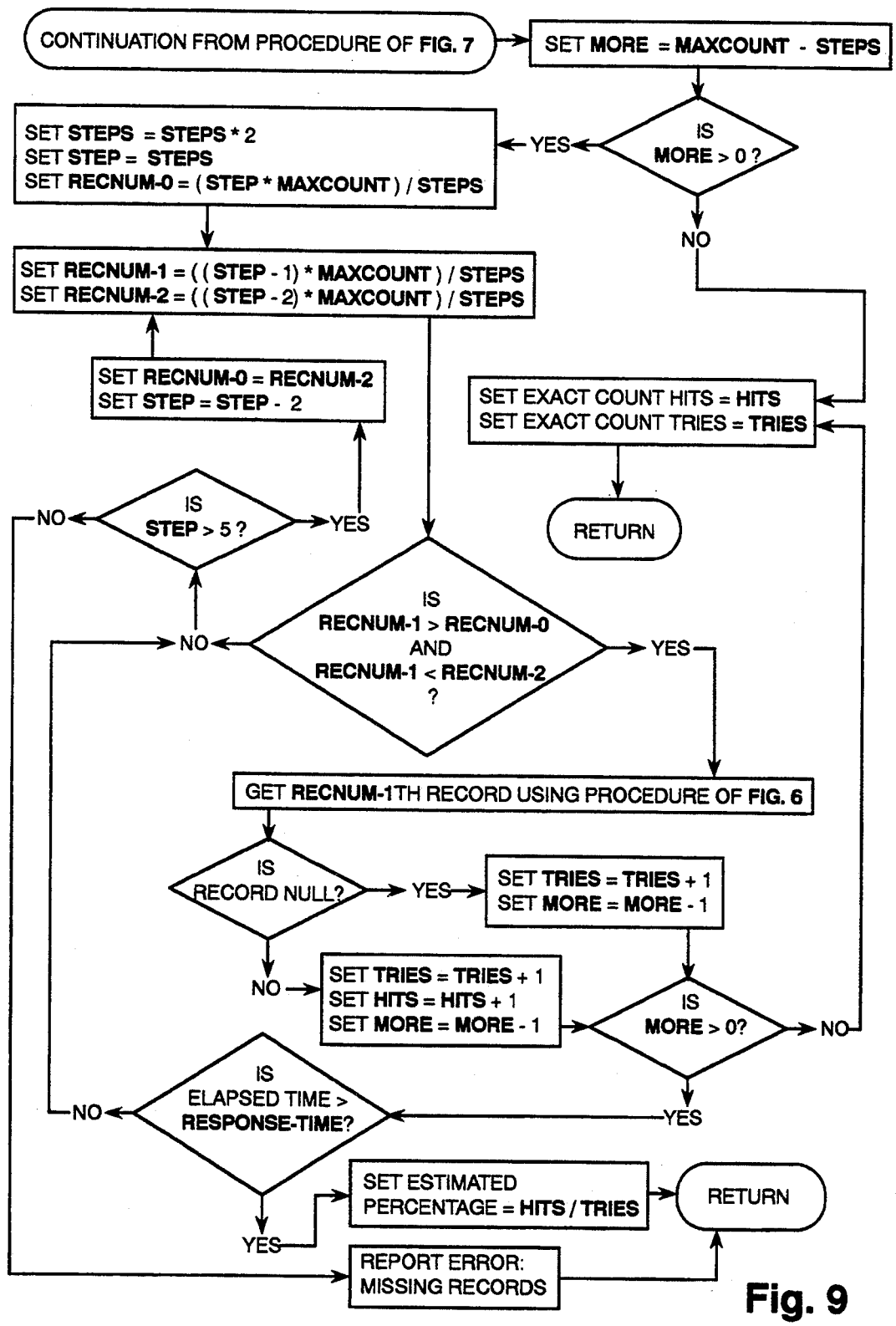
FIG. 9 is a procedure flow chart to count the number of records for a compound query after that number has been estimated by the procedure in FIG. 7.

If this estimate has been returned, and there is more time available to compute a higher accuracy estimate, the procedures of FIG. 7 and FIG. 9 could be continued from where STEP, STEPS, HITS, and TRIES were left off.

RETRIEVING A COMPOUND QUERY COUNT

When the procedure of FIG. 7 has completed sampling potentially intersecting records, there may be time left to actually get a precise count. Using the procedure in FIG. 9, these records can be probed, as time permits. This procedure generates the rows of FIG. 8 where STEPS is greater than MAXCOUNT in columns headed by MAXCOUNT 3, 5, 6, 7, 9. The records in these groups which were unprobed by the procedure in FIG. 7 are indicated by the number followed by a check mark. The procedure of FIG. 9 generates and identifies the check marked numbers by first calculating the number of records remaining to probe, then starting backwards from the MAXCOUNT and examining triplets of record numbers on a finer basis of fractions of MAXCOUNT. Since the intervals from fraction to fraction are half the width of the prior fractions generated by the procedure in FIG. 7, each record number previously unprobed is definitely generated, along with each record number previously generated. By generating new candidate record numbers, and testing them to see if they overlap with prior record numbers, all unprobed record numbers can be generated algorithmically without storing a table of prior record numbers.

For example, to produce the RECNUMS for MAXCOUNT equal to 6, the procedure of FIG. 7 begins STEPS=1, STEP=1, HITS=0, TRIES=0, and RECNUM initially (1*6)/1=6. The 6th record is probed and HITS and TRIES are logged. Elapsed time is checked. Since STEPS is less than 2+STEP, and MAXCOUNT is greater than 2* STEPS, STEPS is multiplied up to 2. RECNUM is then set to (1*6)/2 which yields the integer 3. The 3rd record is probed. Again, STEPS is less than 2+STEP, and MAXCOUNT is greater than 2*STEPS. So STEPS is multiplied up to 4. RECNUM is then set to (1*6)4 which yields the integer 1 after integer truncation. The 1st record is probed. Since STEPS is now greater than 2+STEP, STEP is incremented to 3, and RECNUM is then set to (3*6)/4 which yields the integer 4 after truncation. The 4th record is probed. Since STEPS is now equal to STEP+2, and MAXCOUNT is less than 2* STEPS, the procedure in FIG. 9 is now invoked.

Following FIG. 9, MORE is set to 6 minus 4 which equals 2. STEPS is multiplied up to 8, STEP is set to 8, and RECNUM-0 is set to (8*6)/8=6. Then RECNUM-1 is set to (7*6)/8 which yields the integer 5 after truncation, and RECNUM-2 is set to (6*6)/8 which yields the integer 4 after truncation. Since RECNUM-1 is distinct from both RECNUM-0 and RECNUM-2, it is an unprobed record number. RECNUM-1 is probed and MORE is decremented. Since there MORE is still 1, another record number to probe is sought. A bounds check is made on STEP just prior to decrementing it to prevent a division error. STEP is set to 6. RECNUM-0 is assigned the value of RECNUM-2 which is 4 to save this from being recomputed. Then RECNUM-1 is set to (5*6)/8 which yields 3 after truncation. RECNUM-2 is set to (4*6)/8 which is 3. Since RECNUM-1 equals RECNUM-2, RECNUM-1 has been probed before and so must be skipped. STEP is still greater than 5, so STEP is decremented to 4 and RECNUM-0 gets the RECNUM-2 value of 4. RECNUM-1 is set to (3*6)/8 which yields 2 after truncation, and RECNUM-2 is set to (2*6)/8 which yields 1 after truncation. Since RECNUM-1 is distinct from both RECNUM-0 and RECNUM-2, RECNUM-1 is probed and MORE is decremented. Since MORE is now zero, the exact count of HITS and TRIES is now returned.

APPLICATIONS:

The decreasing size and corresponding increase in speed of micro-processors has created a trend towards distributed databases, where self-contained computer systems linked across a network cooperate to store data.

The reliability and speed of this cooperative processing is dependent upon the simplicity and speed of the underlying data base operations. The common use of queries whose response times vary greatly from query to query for differing datasets both reduces the speed and creates ambiguity for the query requestor which cannot know which of a number of causes such as page faulting or memory allocation for temporary tables has caused the delay, thereby making fallback logic difficult to implement and reducing reliability.

The procedures in FIG. 2, FIG. 3, FIG. 5, FIG. 6, FIG. 7, and FIG. 9 show that a linearly bounded response time is possible, even for large complex queries. In a networked database system, bounded response time is crucial to maintaining a good user interface, since the cost of accessing data across a network must be included in the design. It is highly important not to move data across the network when equivalent functionality is possible without moving the data.

Figure 10:
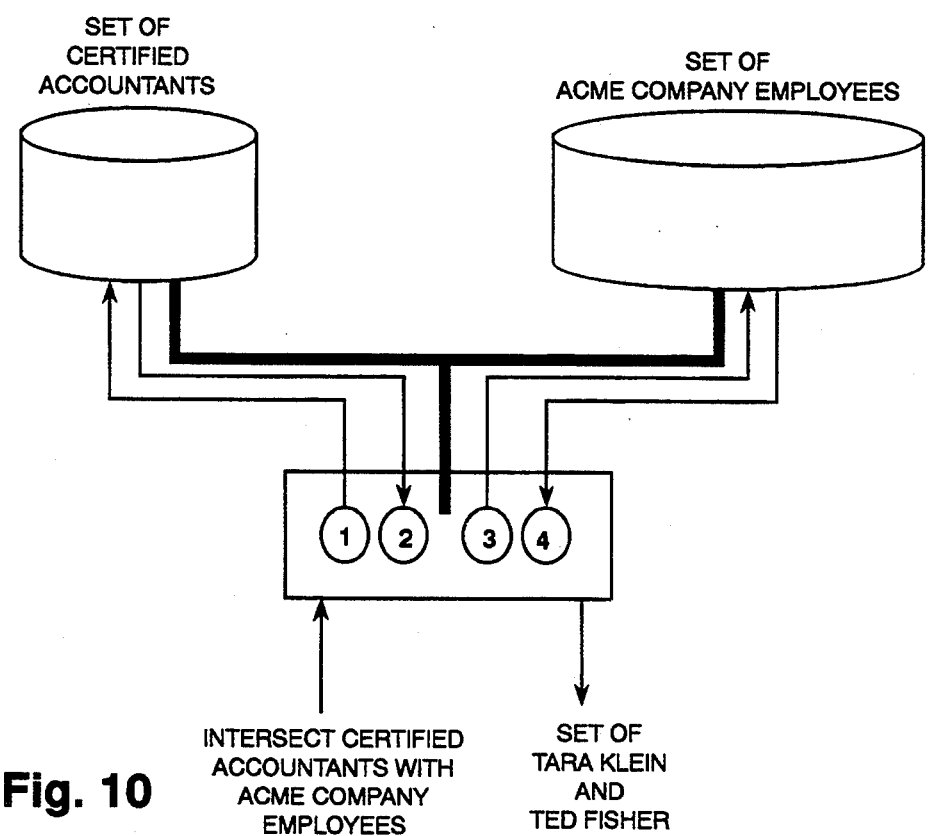
FIG. 10 is a diagram of a distributed database architecture.

In FIG. 10, a simple networked database architecture is shown. The data structure of FIG. 1 is split across two networked computer systems. All data prefixed by "certified accountants include:" resides on the left-hand computer and all data prefixed by "Acme company employees include:" resides on the right-hand computer. The third networked computer indicated by the rectangular box originating the query for the set intersection between the two prefixes is distinct from the other two computers, and so it must conserve the number of symbols transmitted back and forth on the network in making this query. It can do this for each possible intersection record in four steps indicated by the circled numbers in FIG. 10:

STEP 1 requests the nth record of "certified accountants include:" from the left hand computer.

STEP 2 receives the nth record of "certified accountants include:" from the left hand computer.

STEP 3 requests the corresponding record of "Acme company employees include:" from the right-hand computer.

I claim:

1. A computer implemented method for searching an information tree of record keys with a search key to locate and retrieve a plurality of data records of a database held in the memory of a data processing system, wherein:

each of said record keys represents one of said data records and comprises a string of a plurality ("s") of characters, the number s of said characters differing for different ones of said record keys;

said search key comprises a string of a plurality ("k") of characters; said tree comprises a plurality of linked information nodes held in said memory, wherein each of at least some of said nodes comprises:

(i) a field holding a string of the i-th through p-th successive characters common to all of the record keys represented by all of at least one subtree of said each of at least some of said nodes;

(ii) a second field holding either a null pointer or containing a pointer to another of said nodes for which said i-th through p-th successive characters represent an initial portion of the respective key;

(iii) a third field containing the total number of record keys represented by said field (i); and (iv) a fourth field containing either a null pointer or containing a pointer to another of said nodes which contains filed (i) similarly having j-th through n-the successive characters common to all of the record keys represented by all of at least one subtree of said each of at least some of said nodes, said j-th character greater than said ith character in some alphabetical ordering;

said method characterized by:

(step zero)

for each one of said nodes, comparing the string of the i-th through p-th successive characters of said search key with the record key character string held in the first field of said node, and (1) if said search key string does not match said record key string, then (a) if the fourth field of said node does not contain said null pointer then jumping to (step zero) using said node pointed to by said fourth field, but (b) if the fourth field of said node contains a null then immediately terminating search and returning a message signifying NOT FOUND from the search, but (2) if said search key string matches said record key string, then (a) if k=p, then immediately terminating search and returning the number stored in the third field of said node with a message signifying FOUND from the search, but (b) if k>p, then (i) if said second field contains a pointer to another of said nodes, then removing the first k successive characters from said search key and jumping to (step zero) using the node pointed to by said second field, but (ii) if said second field contains a null pointer then immediately terminating search and returning a message signifying NOT FOUND from the search.

* * * * *